(12) United States Patent
Walley et al.

(10) Patent No.: US 8,184,049 B2
(45) Date of Patent: May 22, 2012

(54) METHOD AND SYSTEM FOR SHARING CLOCK SOURCES TO SAVE POWER ON A GNSS ENABLED MOBILE DEVICE

(75) Inventors: John Walley, Ladera Ranch, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 350 days.

(21) Appl. No.: 12/509,426

(22) Filed: Jul. 24, 2009

(65) Prior Publication Data

US 2011/0018764 A1    Jan. 27, 2011

(51) Int. Cl.
*G01S 19/34* (2010.01)
(52) U.S. Cl. .................................. 342/357.74
(58) Field of Classification Search .............. 342/357.74
See application file for complete search history.

(56) References Cited

FOREIGN PATENT DOCUMENTS
EP    1715358 A1    10/2006
WO    WO99/13595 A1    2/1999

OTHER PUBLICATIONS

European Patent Office, Communication with European Search Report, in Application No. EP 10007586.0, dated Dec. 14, 2010.

*Primary Examiner* — Thomas H. Tarcza
*Assistant Examiner* — Fred H Mull
(74) *Attorney, Agent, or Firm* — Sterne, Kessler, Goldstein & Fox, P.L.L.C.

(57) ABSTRACT

A GNSS enabled mobile device selects an associated local GNSS clock or host clock as a clock source to operate a GNSS radio and one or more non-GNSS radios within the GNSS enabled mobile device. When the GNSS radio is in a GNSS active mode, the local GNSS clock is turned ON and selected to be shared with the host. The host operates the GNSS radio and the non-GNSS radios only using the local GNSS clock instead of the host clock. The host clock is turned OFF to save power. When the GNSS radio is in a GNSS inactive mode, the host clock is turned ON and selected to operate the non-GNSS radios. The local GNSS clock is turned OFF to save power. The non-GNSS radios comprise a Bluetooth radio, a WiFi radio, a FM radio, a cellular radio and/or a WiMAX radio.

20 Claims, 4 Drawing Sheets

METHOD AND SYSTEM FOR SHARING CLOCK SOURCES TO SAVE POWER ON A GNSS ENABLED MOBILE DEVICE

CROSS-REFERENCE TO RELATED APPLICATIONS/INCORPORATION BY REFERENCE

Not Applicable.

FIELD OF THE INVENTION

Certain embodiments of the invention relate to communication systems. More specifically, certain embodiments of the invention relate to a method and system for sharing clock resources to save power on a GNSS enabled mobile device.

BACKGROUND OF THE INVENTION

The Global Positioning System (GPS), the Global Orbiting Navigation Satellite System (GLONASS), and the satellite navigation system GALILEO are examples of Global Navigation Satellite Systems (GNSS). A GNSS utilizes an earth-orbiting constellation of a plurality of satellites each broadcasting GNSS signals which indicates its precise location and ranging information. From particular given locations on or near the earth, GNSS receivers may detect valid GNSS signals using a temperature compensated crystal oscillator (TCXO) and take various GNSS measurements such as pseudorange, carrier phase, and/or Doppler to calculate navigation information such as GNSS receiver positions, velocity, and time.

The GNSS receivers, which comprise GPS, GALILEO and/or GLONASS receivers, may be integrated within or externally coupled to mobile devices for navigation applications such as E911, location-based 411, location-based messaging and/or friend finding. The mobile devices may provide connections to access applications such as route tracking, multimedia communication, song downloading, instant messaging, making phone call, and/or mobile television (TV). Depending on the usage of the mobile devices, multiple technologies such as GNSS, wireless WAN (cellular and/or WiMAX), high-speed wireless LAN (WiFi), short-range wireless (Bluetooth), FM and mobile TV, may be integrated within the mobile devices to support corresponding applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for sharing clock resources to save power on a GNSS enabled mobile device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing clock resources to save power on a GNSS enabled mobile device. In various embodiments of the invention, a GNSS enabled mobile device may be operable to select a local GNSS clock of an associated GNSS receiver or a host clock of the GNSS enabled mobile device as a clock source. The selected clock source may be utilized to operate a GNSS radio and one or more non-GNSS radios within the GNSS enabled mobile device. The GNSS radio may operate in a GNSS active mode or in a GNSS inactive mode. In instances where the GNSS radio is in the GNSS active mode, the local GNSS clock may be turned ON for GNSS activities such as GNSS signal detection. The local GNSS clock may be selected and shared with the host of the GNSS enabled mobile device. The host of the GNSS enabled mobile device may be operable to the GNSS radio and the one or more non-GNSS radios within the GNSS enabled mobile device only using the local GNSS clock instead of the host clock. The host clock may be turned OFF to save power when the GNSS radio is in the GNSS active mode. In instances where the GNSS radio is in the GNSS inactive mode, the host clock may be turned ON. The host clock may be selected to be used by the host of the GNSS enabled mobile device to operate the one or more non-GNSS radios. The local GNSS clock may be disabled or turned OFF to save power when the GNSS radio is in the GNSS inactive mode. The one or more non-GNSS radios may comprise a Bluetooth radio, a WiFi radio, a FM radio, a cellular radio and/or a WiMAX radio.

Figure 1:
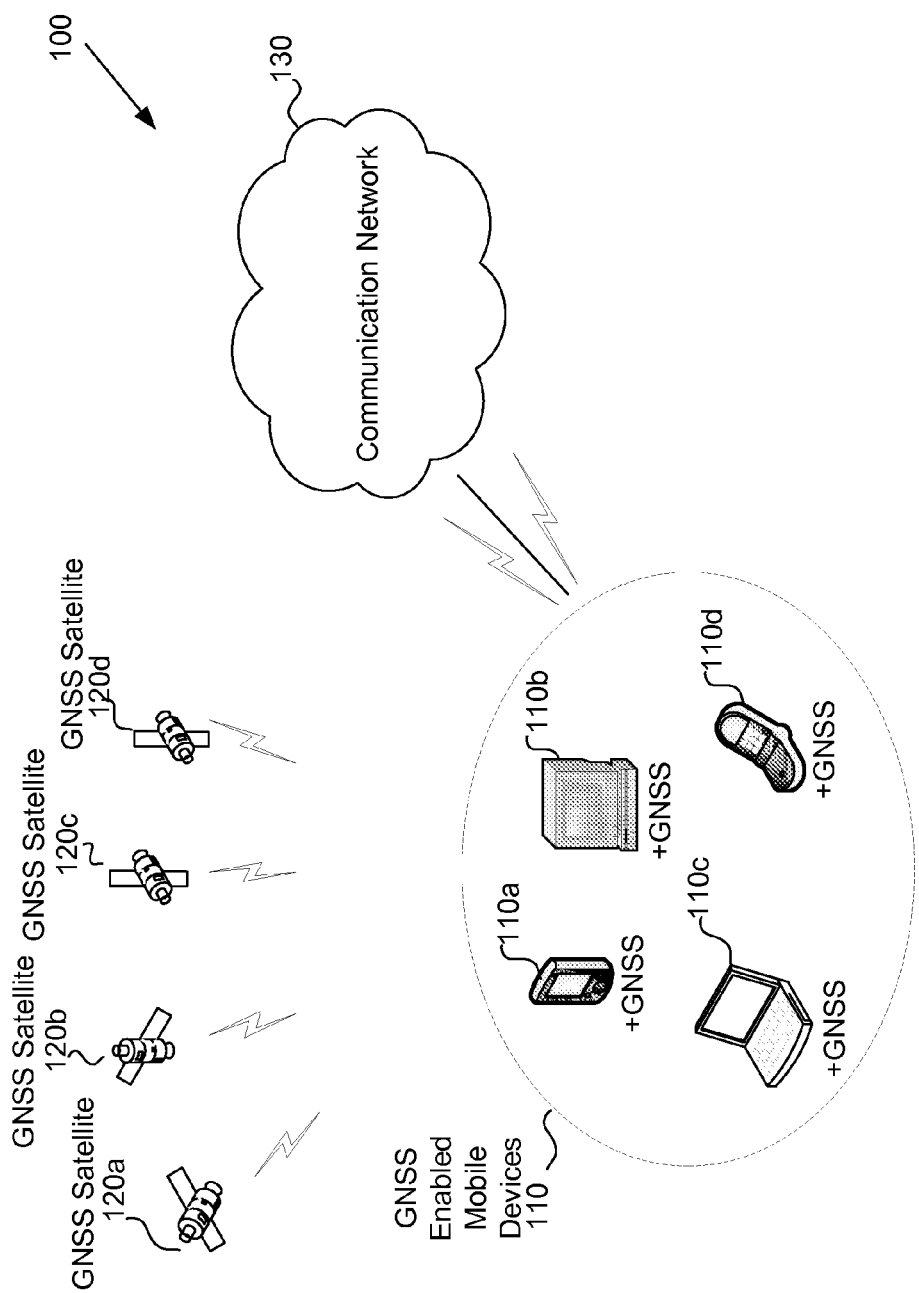
FIG. 1 is a diagram illustrating an exemplary communication system that supports sharing a clock source within GNSS enabled mobile devices to save power, in accordance with an embodiment of the invention.

FIG. 1 is a diagram illustrating an exemplary communication system that supports sharing clock source within GNSS enabled mobile devices to save power, in accordance with an embodiment of the invention. Referring to FIG. 1, there is shown a communication system 100. The communication system comprises a plurality of GNSS enabled mobile devices, of which GNSS enabled mobile devices 110a-110d are illustrated, a plurality of GNSS satellites, of which GNSS satellites 120a-120d are illustrated, and a communication network 130.

A GNSS enabled mobile device such as the GNSS enabled mobile device 110a may comprise suitable logic, circuitry, interfaces and/or code that are operable to communicate radio signals across the communication network 130 and receive GNSS broadcast signals from a plurality of visible GNSS satellites such as the GNSS satellites 120a through 120d. The GNSS signals may be detected and received at the GNSS enabled mobile device 1110a using a reference clock. The reference clock may be provided by a local GNSS clock such as a temperature compensated crystal oscillator (TCXO) within the GNSS enabled mobile device 110a for low phase noise. The received GNSS signals may be utilized to determine navigation information such as a position fix and/or a velocity of the GNSS enabled mobile device 1110a. Depending on device capabilities, the GNSS enabled mobile device 110a may be integrated with technologies comprising, for example, Ethernet, wireless WAN (cellular and/or WiMAX), high-speed wireless LAN (WiFi), short-range wireless (Bluetooth), FM receive, FM transmit, and mobile TV to provide access to a wide range of applications such as, making phone calls, downloading songs, checking location, listening to talk shows and/or watching sportscasts.

The GNSS enabled mobile device 110a may operate at a host clock frequency to run various applications such as roadside assistance. The host clock frequency may be generated by a system clock (a host clock) of the GNSS enabled mobile device 110a. Depending on the type of application, the GNSS enabled mobile device 110a may be configured to operate in a GNSS active mode or in a GNSS inactive mode. In the GNSS active mode, the GNSS enabled mobile device 110a may be operable to detect and receive GNSS signals using the local GNSS clock. The received GNSS signals may be processed to calculate navigation information such as a position fix of the GNSS enabled mobile device 110a. In the GNSS inactive mode, no activities on GNSS signals may be performed within the GNSS enabled mobile device 110a. The local GNSS clock may be turned OFF to save power. In this regard, the GNSS enabled mobile device 110a may be operable to manage and schedule the usage of the local GNSS clock and/or the host clock. In order to operate various radios such as a GNSS radio and/or one or more non-GNSS radios within the GNSS enabled mobile device, one of the local GNSS clock and the host clock may be activated at a time to conserve power. In this regard, when the GNSS enabled mobile device 110a is in the GNSS active mode, the host clock may be turned OFF and the local GNSS clock may be shared to operate the GNSS radio and/or the one or more none-GNSS radios within the GNSS enabled mobile device 110a. In this regard, when the GNSS enabled mobile device 110a is in the GNSS active mode, the one or more non-GNSS radios within the GNSS enabled mobile device 1110a may be operated using the local GNSS clock. When the GNSS enabled mobile device 1110a is in the GNSS inactive mode, the local GNSS clock may be turned OFF and the host clock may be turned ON to operate the one or more none-GNSS radios within the mobile device 1110a. The non-GNSS radios may comprise a Bluetooth radio, a WiFi radio, a FM radio, cellular radios and/or a WiMAX radio.

A GNSS satellite such as the GNSS satellite 120a may comprise suitable logic, circuitry, interfaces and/or code that is operable to provide satellite navigational information to various GNSS receivers on earth. The GNSS receivers, which comprise GPS, GALILEO and/or GLONASS receivers are integrated within or externally coupled to GNSS capable mobile devices such as the GNSS enabled mobile devices 110a through 110d. The GNSS satellite 120a may be operable to broadcast its own ephemeris periodically, for example, once every 30 seconds. The broadcast ephemeris may be utilized to calculate navigation information such as, for example, position, velocity, and clock information of the GNSS receivers. The GNSS satellite 120a may be operable to update ephemeris, for example, every two hours. The broadcast ephemeris may be valid for a limited time period such as, for example, 2 to 4 hours into the future (from the time of broadcast).

The communication network 130 may comprise suitable logic, circuitry, interfaces and/or code that may be operable to provide data services to various mobile devices such as the GNSS enabled mobile devices 110a-110d by using a particular technology such as Ethernet, wireless WAN (cellular and/or WiMAX), high-speed wireless LAN (WiFi), short-range wireless (Bluetooth), FM and mobile TV. The communication network 130 may be a wired high-speed connection such as an Ethernet network, or may be a wireless network such as, for example, wireless WAN (cellular and/or WiMAX), high-speed wireless LAN (WiFi), short-range wireless (Bluetooth), FM and mobile TV.

In an exemplary operation, a GNSS enabled mobile device such as the GNSS enabled mobile device 110a may be operable to detect and receive GNSS signals from, for example, the GNSS satellites 120a-120d, using the local GNSS clock. The GNSS enabled mobile device 110a may be operable to utilize the received GNSS signals to calculate, for example, a position fix of the GNSS enabled mobile device 110a. The calculated position fix may be communicated with the host of the GNSS enabled mobile device 110a for various location-based applications such as roadside assistance. The host of the GNSS enabled mobile device 110a may be operable to control and/or manage operations of various radios such as a GNSS radio and one or more non-GNSS radios within the GNSS enabled mobile device 110a. One of the local GNSS clock and the host clock may be selected and activated at a time to save power. With the GNSS enabled mobile device 110a in the GNSS active mode, the GNSS enabled mobile device 110a may be operable to turn OFF the host clock and turn ON the local GNSS clock used to operate the GNSS radio and/or the one or more non-GNSS radios within the GNSS enabled mobile device 110a. With the GNSS enabled mobile device 110a in the GNSS inactive mode, the GNSS enabled mobile device 110a may be operable to turn OFF the local GNSS clock and turn ON the host clock used to operate the one or more non-GNSS radios with the GNSS enabled mobile device 110a.

Figure 2:
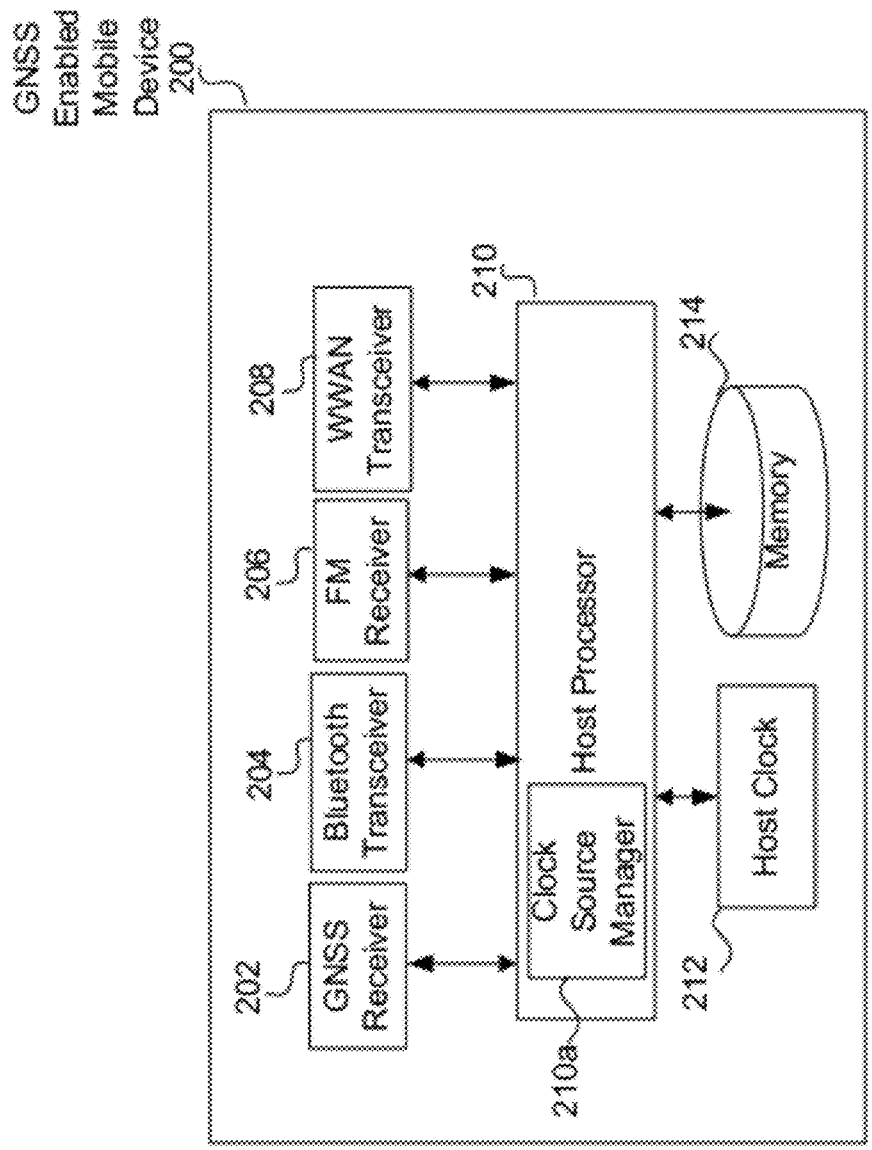
FIG. 2 is a block diagram illustrating an exemplary GNSS enabled mobile device that is operable to share a clock source to save power, in accordance with an embodiment of the invention.

FIG. 2 is a block diagram illustrating an exemplary GNSS enabled mobile device that is operable to share clock source to save power, in accordance with an embodiment of the invention. Referring to FIG. 2, there is shown a GNSS enabled mobile device 200. The GNSS enabled mobile device 200 may comprise a GNSS receiver 202, a Bluetooth transceiver 204, a FM receiver 206, a wireless wide area network (WWAN) transceiver 208, a host processor 210, a host clock 212, and a memory 214. The host processor comprises a clock source manager 210a The GNSS receiver 202 may comprise suitable logic, circuitry, interfaces and/or code that may be operable to detect and receive GNSS signals from a plurality of visible GNSS satellites using a local GNSS clock such as a TCXO. The GNSS receiver 202 may be operable to utilize the received GNSS signals to calculate navigation information such as a position fix and/or velocity of the GNSS receiver 202. The calculated navigation information may be provided to the host processor 210 for various location-based applications such as, for example, location-based 411. The GNSS receiver 202 may operate in a GNSS active mode or in a GNSS inactive mode. In the GNSS active mode, the GNSS receiver 202 may be operable to perform GNSS activities such as GNSS signal acquisition and GNSS signal processing using the local GNSS clock. In the GNSS inactive mode, the GNSS receiver 202 may perform no GNSS activities. Components such as the local GNSS clock of the GNSS receiver 202 may be turned OFF to save power.

The Bluetooth transceiver 204 may comprise suitable logic, circuitry, interfaces and/or code that may be operable to communicate Bluetooth radio signals over the communication network 130. The Bluetooth transceiver 204 may be operable to process Bluetooth radio signals using a clock source from the host processor 210.

The FM receiver 206 may comprise suitable logic, circuitry, interfaces and/or code that may be operable to receive FM data and/or FM RDS data over the communication network 130. The FM receiver 206 may be operable to process the received FM data and/or FM RDS data using a clock source from the host processor 210.

The WWAN transceiver 208 may comprise suitable logic, circuitry, interfaces and/or code that may be operable to communicate radio signals over the communication network 130. The communicated radio signals may comprise cellular and/or WiMAX signals. The WWAN transceiver 208 may be operable to process cellular and/or WiMAX signals using a clock source from the host processor 210.

The host processor 210 may comprise suitable logic, circuitry, interfaces and/or code that may be operable to process signals from various radios such as, for example, the GNSS receiver 202, the Bluetooth transceiver 204, the FM receiver 206, and/or the WWAN transceiver 208. The host processor 210 may be operable to communicate with the communication network 130 to access various applications such as downloading songs, checking location, listening to talk shows and/or emergency calling. Applications may be synchronized to, for example, a host clock of the host processor 210 and processed by the host processor 210. The host processor 210 may be operable to manage and control operation modes of the GNSS receiver 202. The host processor 210 may be operable to activate the GNSS receiver 202 on an as a needed basis to conserve power. The host processor 210 may be operable to signal the GNSS receiver 202 to operate in the GNSS active mode or in the GNSS inactive mode. The host processor 210 may be operable to communicate with the clock source manager 210a for a clock source used to operate non-GNSS radios such as, for example, the Bluetooth transceiver 204, the FM receiver 206, and the WWAN transceiver 208 within the GNSS enabled mobile device 200.

The clock source manager 210a may comprise suitable logic, circuitry, interfaces and/or code that may be operable to select one of the local GNSS clock and the host clock at a time to be used to run corresponding active applications. The selection may be made based on an operation mode of the GNSS receiver 202. For example, the local GNSS clock may be selected when the GNSS receiver 202 is in the GNSS active mode. The host clock may be selected when the GNSS receiver 202 is the GNSS inactive mode. The unselected clock source may be turned OFF to save power.

The host clock 212 may comprise suitable logic, circuitry, interfaces and/or code that may be operable to provide a clock source to the host processor 210. The clock source may be implemented via a crystal oscillator (XO), for example, and utilized for application synchronization and application processing. The operation status of the host clock 212 may depend on an operating mode of the GNSS receiver 202. The host clock 212 may be turned ON or OFF based on the mode of operation of the GNSS receiver 202. For example, the host clock 202 may be turned OFF to save power when the local GNSS clock of the GNSS receiver 202 is available for applications. The host clock 202 may be turned ON when the local GNSS clock becomes unavailable for applications.

The memory 214 may comprise suitable logic, circuitry, and/or code that operable to store information such as executable instructions and data that may be utilized by the host processor 212. The memory 214 may comprise RAM, ROM, low latency nonvolatile memory such as flash memory and/or other suitable electronic data storage.

In an exemplary operation, the GNSS receiver 202 may be operable to receive GNSS signals from each of the visible GNSS satellites using a local GNSS clock such as a TCXO. The GNSS receiver 202 may be operable to calculate a position fix and/or velocity of the GNSS receiver 202 to be provided to the host processor 210 for a location-based application such as roadside assistance. The host processor 210 may be operable to control and/or manage operations of the Bluetooth transceiver 204, the FM receiver 206 and/or the WWAN transceiver 208 using a specific clock source selected by the clock source manager 210a. The clock source manager 210a may select the specific clock source from one of the local GNSS clock and the host clock based on an operating mode of the GNSS receiver 202. For example, the local GNSS clock may be selected as the specific clock source when the GNSS receiver 202 is in the GNSS active mode. Otherwise, the host clock may be selected. The unselected clock source may be turned OFF to conserve power.

Figure 3:
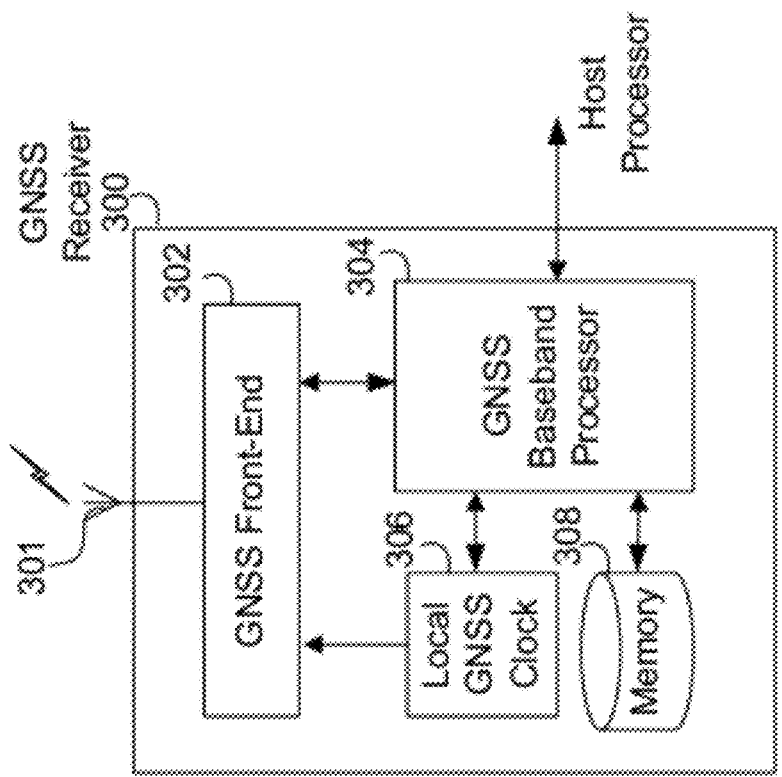
FIG. 3 is a block diagram illustrating an exemplary GNSS receiver that is operable to share a local clock source with an associated host device, in accordance with an embodiment of the invention.

FIG. 3 is a block diagram illustrating an exemplary GNSS receiver that is operable to share a local clock source with an associated host device, in accordance with an embodiment of the invention. Referring to FIG. 3, there is shown a GNSS receiver 300. The GNSS receiver 300 may comprise a GNSS antenna 301, a GNSS front-end 302, a GNSS processor 304, a local GNSS clock 306, and a memory 308.

The GNSS receiver 300 may comprise suitable logic, circuitry, interfaces and/or code that may be operable to track and receive GNSS signals using the local GNSS clock 306. The GNSS processor 304 may be operable to decode and process the received GNSS signals for a position fix of the GNSS receiver 300. The GNSS receiver 300 may operate in a GNSS active mode or in a GNSS inactive mode. In the GNSS active mode, the GNSS receiver 300 may wake up to perform various GNSS activities such as GNSS signal acquisition and GNSS signal processing. In the inactive mode, the GNSS receiver 300 may be operable to shut down (turn OFF) to conserve power.

The GNSS antenna 301 may comprise suitable logic, circuitry, interfaces and/or code that may be operable to receive GNSS signals from a plurality of visible GNSS satellites such as the GNSS satellites 120a through 120d. The GNSS antenna 301 may be operable to communicate the received GNSS signals to the GNSS front-end 302 for further processing.

The GNSS front-end 302 may comprise suitable logic, circuitry, interfaces and/or code that may be operable to convert the received GNSS signals to GNSS baseband signals, which may be suitable for further processing in the GNSS processor 304 for calculating navigation information of the GNSS receiver 300. The GNSS front-end 302 may be turned on or off depending on the operation mode of the GNSS receiver 300. For example, the GNSS front-end 302 or portions thereof, may be turned ON or OFF with respect to the GNSS receiver 300 in the GNSS active mode or in the GNSS inactive mode, respectively.

The GNSS baseband processor 304 may comprise suitable logic, circuitry, interfaces and/or code that may be operable to process GNSS baseband signals from the RF front-end 302 to extract the information and data bits conveyed in the received GNSS signals. The GNSS baseband processor 304 may be operable to perform functions such as clock recovery, channel selection, demodulation, and/or decoding. To reduce the battery consumption and extend battery life, the GNSS baseband processor 304 may be shut down (turned OFF) or wake up depending on the operation mode of the GNSS receiver 300. For example, the GNSS baseband processor 304 may be shut down (turned OFF) when the GNSS receiver 300 may operate in the GNSS inactive mode. The GNSS baseband processor 304 may wake up (turn ON) when the GNSS receiver 300 may operate in the GNSS active mode.

The local GNSS clock 306 may comprise suitable logic, circuitry, interfaces and/or code that may be operable to provide clock source for GNSS activities in the GNSS front-end 302 and the GNSS baseband processor 304. The GNSS clock 306 may be turned ON or OFF based on the corresponding operation mode of the GNSS receiver 300. The GNSS clock 306 may be turned OFF to conserve power when the GNSS receiver 300 may operate in the GNSS inactive mode. When the GNSS receiver 300 may operate in the GNSS active mode, the GNSS clock 306 may be turned ON to provide clock source for various operations in the GNSS receiver 300 as well as the host processor 210.

The memory 308 may comprise suitable logic, circuitry, interfaces and/or code that may enable storage of information such as executable instructions and data that may be utilized by the GNSS baseband processor 304. The executable instructions may comprise algorithms that may be enabled to calculate a position fix of the GNSS receiver 300 using GNSS measurements. The data may comprise the determined position fix of the GNSS receiver 300. The memory 308 may comprise RAM, ROM, low latency nonvolatile memory such as flash memory and/or other suitable electronic data storage.

In operation, the GNSS receiver 300 may be operable to process, using a clock source provided by the local GNSS clock 306, GNSS signals received via the antenna 301 for GNSS measurements. The GNSS front-end 302 may be operable to process the received GNSS signals and convert into GNSS baseband signals. The converted GNSS baseband signals may communicate with the GNSS baseband processor 304 for GNSS baseband processing. The processed GNSS baseband signals may be forward to the host processor 210 to be used for determining a position fix, for example, of the GNSS receiver 300. The GNSS baseband processor 304 may be operable to utilize information and/or data stored in the memory 308 to calculate the position fix and communicate with the host processor 210 for a location-based application. In instances when the GNSS receive 300 may operate in the GNSS active mode, the clock source from the local GNSS clock 306 may be shared with the host to operate one or more non-GNSS radios such as the Bluetooth transceiver 204, the FM receiver 206, and the WWAN transceiver 208 within an associated GNSS enabled mobile device such as the GNSS enabled mobile device 200. When the GNSS receiver 300 may operate in the GNSS inactive mode, components such as the GNSS baseband processor 304, the GNSS front-end 302, and the local GNSS clock 306 may disabled or turned OFF to reduce power consumption. When the GNSS receiver 300 may operate in the GNSS active mode, the GNSS baseband processor 304, the GNSS front-end 302, and the GNSS clock 306 may wake up (turned ON) to perform corresponding GNSS activities. The clock source provided by the GNSS clock 308 may also be shared by the host processor 210 used for various applications depending on device capabilities.

Figure 4:
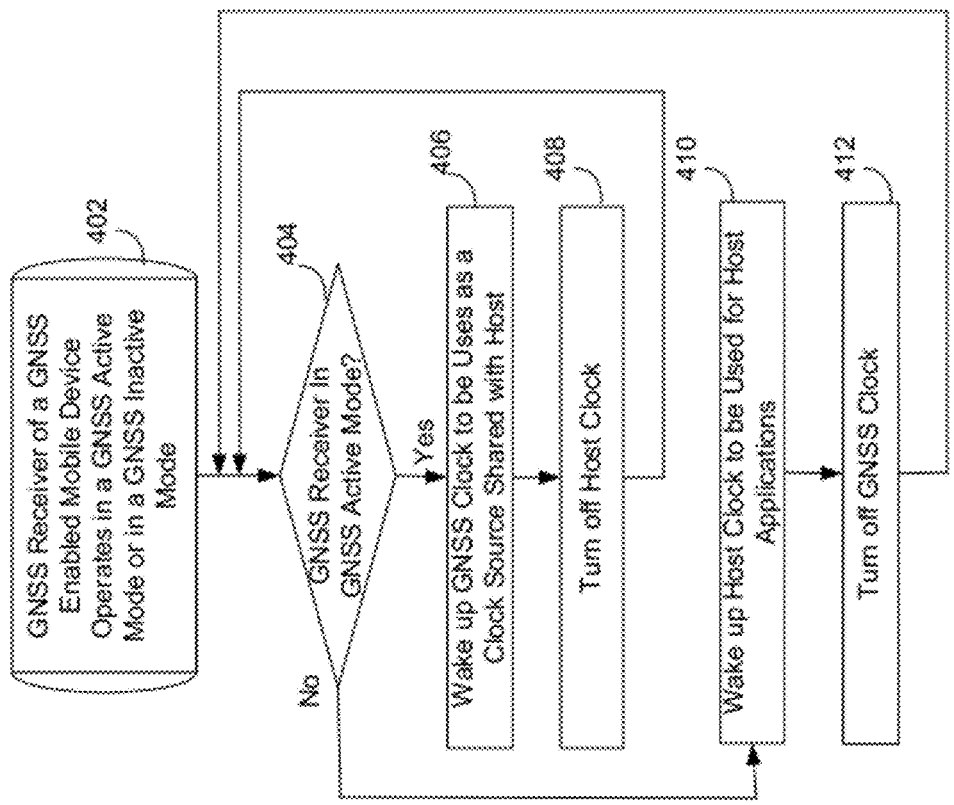
FIG. 4 a flow chart illustrating an exemplary clock source sharing procedure that is utilized in a GNSS enabled mobile device, in accordance with an embodiment of the invention.

FIG. 4 a flow chart illustrating an exemplary clock source sharing procedure that is utilized in a GNSS enabled mobile device, in accordance with an embodiment of the invention. Referring to FIG. 4, the exemplary steps may start with the step 402. In step 402, the GNSS receiver 300 may operate in a GNSS active mode or in a GNSS inactive mode. In step 404, it may be determined that whether the GNSS receiver 300 may operate in a GNSS active mode. In instances where the GNSS receiver 300 may operate in a GNSS active mode, then in step 406, where the local GNSS clock 306 may be enabled (turned ON) so that it may be utilized as a clock source for GNSS related operations or functions. The clock source may also be shared with the host processor 210. In step 408, the host processor 210 may be operable to operate one or more non-GNSS radios such as the Bluetooth receiver 204, the FM receiver 206, and the WWAN transceiver 208 within the GNSS enabled mobile device 200 using the clock source provided by the local GNSS clock 306. The host clock 212 may be disabled or turned OFF to save power. The exemplary steps may return to step 404.

In step 404, in instances where the GNSS receiver 300 may operate in a GNSS inactive mode, then in step 410, where the host clock 212 may wake up (turned on) to be used for host applications. In step 412, the GNSS clock 306 may be turned off to conserve power. The exemplary steps may return to step 404.

In various exemplary aspects of the method and system for sharing clock resource to save power on a GNSS enabled mobile device, as described with respect to, for example, FIG. 1 through FIG. 4, a GNSS enabled mobile device such as the GNSS enabled mobile device 200 may be operable to select one of a local GNSS clock of the GNSS receiver 202 and a host clock of the GNSS enabled mobile device 200 as a clock source. The local GNSS clock and the host clock may be provided by the local GNSS clock 306 and the host clock 212, respectively. The selected clock source may be utilized to operate a GNSS radio such as the GNSS receiver 202 and one or more non-GNSS radios such as the Bluetooth transceiver 204 within the GNSS enabled mobile device 200. The GNSS receiver 202 may operate in a GNSS active mode or in a GNSS inactive mode. In instances where the GNSS receiver 202 may be in the GNSS active mode, the local GNSS clock 306 may be enabled or turned ON for GNSS activities such as GNSS signal detection and GNSS signal measurements. The local GNSS clock 306 may be selected and shared with the host processor 210. In this regard, the host processor 212 may be operable to operate the GNSS receiver 202 and the one or more non-GNSS radios such as the Bluetooth transceiver 204 within the GNSS enabled mobile device 200 only using the selected local GNSS clock 306 instead of the host clock 212. The host clock 212 may be turned OFF to save power when the GNSS receiver 202 is in the GNSS active mode. In instances where the GNSS receiver 202 may be in the GNSS inactive mode, the host clock 212 may be turned ON. The host clock 212 may be selected to be used by the host processor 210 to operate the one or more non-GNSS radios such as the Bluetooth transceiver 204 and/or the FM receiver 206. The local GNSS clock 306 may be disabled or turned OFF to save power when the GNSS receiver 202 is in the GNSS inactive mode. The one or more non-GNSS radios may comprise a Bluetooth radio, a WiFi radio, a FM radio, a cellular radio and/or a WiMAX radio.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for sharing clock resource to save power on a GNSS enabled mobile device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
performing by one or more processors and/or circuits in a Global Navigation Satellite Systems (GNSS) enabled mobile device, wherein said one or more processors and/or circuits comprise a first source that is operable to generate a local GNSS clock and a second source that is operable to generate a host clock:
selecting one of said local GNSS clock and said host clock of said GNSS enabled mobile device as a clock source; and
operating a GNSS radio and one or more non-GNSS radios within said GNSS enabled mobile device using said selected clock source.

2. The method according to claim 1, comprising turning ON said local GNSS clock when said GNSS radio is active.

3. The method according to claim 2, comprising selecting said local GNSS clock as said clock source when said GNSS radio is active.

4. The method according to claim 3, comprising operating said GNSS radio and said one or more non-GNSS radios within said GNSS enabled mobile device using only said selected local GNSS clock.

5. The method according to claim 2, comprising turning OFF said host clock when said GNSS radio is active.

6. The method according to claim 5, comprising operating said one or more non-GNSS radios within said GNSS enabled mobile device without using said host clock.

7. The method according to claim 1, comprising turning ON said host clock when said GNSS radio is inactive.

8. The method according to claim 7, comprising selecting said host clock as said clock source when said GNSS radio is inactive.

9. The method according to claim 1, wherein said one or more non-GNSS radios comprise a Bluetooth radio, a WiFi radio, a FM radio, cellular radios and/or a Worldwide Interoperability for Microwave Access (WiMAX) radio.

10. A system for communication, the system comprising:
one or more processors and/or circuits for use in a Global Navigation Satellite Systems (GNSS) enabled mobile device, wherein:
said one or more processors and/or circuits comprise a first source that is operable to generate a local GNSS clock and a second source that is operable to generate a host clock; and
said one or more processors and/or circuits are operable to:
select one of said local GNSS clock and said host clock of said GNSS enabled mobile device as a clock source; and
operate a GNSS radio and one or more non-GNSS radios within said GNSS enabled mobile device using said selected clock source.

11. The system according to claim 10, wherein said one or more processors and/or circuits are operable to turn ON said selected local GNSS clock when said GNSS radio is active.

12. The system according to claim 11, wherein said one or more processors and/or circuits are operable to select said local GNSS clock as said clock source when said GNSS radio is active.

13. The system according to claim 12, wherein said one or more processors and/or circuits are operable to operate said GNSS radio and said one or more non-GNSS radios.

14. The system according to claim 11, wherein said one or more processors and/or circuits are operable to turn OFF said selected host clock when said GNSS radio is active.

15. The system according to claim 14, wherein said one or more processors and/or circuits are operable to operate said one or more non-GNSS radios within said GNSS enabled mobile device without using said host clock.

16. The system according to claim 10, wherein said one or more processors and/or circuits are operable to turn ON said selected host clock when said GNSS radio is inactive.

17. The system according to claim 16, wherein said one or more processors and/or circuits are operable to select said host clock as said clock source when said GNSS radio is inactive.

18. The system according to claim 17, wherein said one or more processors and/or circuits are operable to turn OFF said local GNSS clock when said GNSS radio is inactive.

19. The system according to claim 10, wherein said one or more non-GNSS radios comprise a Bluetooth radio, a WiFi radio, a FM radio, cellular radios and/or a Worldwide Interoperability for Microwave Access (WiMAX) radio.

20. A system for communication, the system comprising:
one or more circuits for use in a Global Navigation Satellite Systems (GNSS) enabled mobile device, said one or more circuits comprising a first clock source and a second clock source;
said first clock source being operable to generate a local GNSS clock;
said second clock source being operable to generate a host clock;
said one or more circuits being operable to select as a source clock one of said local GNSS clock and said host clock; and
said one or more circuits being operable to provide said source clock to a GNSS radio and two or more non-GNSS radios, all of which are within said GNSS enabled mobile device.

* * * * *